US011320901B2

(12) United States Patent
Hong

(10) Patent No.: US 11,320,901 B2
(45) Date of Patent: May 3, 2022

(54) HEAD-UP DISPLAY SYSTEM AND DISPLAY METHOD, VEHICLE, HEAD-UP DISPLAY DEVICE, AND COMPUTER-READABLE STORAGE MEDIUM

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 16/633,599

(22) PCT Filed: May 31, 2019

(86) PCT No.: PCT/CN2019/089439
§ 371 (c)(1),
(2) Date: Jan. 24, 2020

(87) PCT Pub. No.: WO2019/228488
PCT Pub. Date: Dec. 5, 2019

(65) Prior Publication Data
US 2020/0209960 A1 Jul. 2, 2020

(30) Foreign Application Priority Data

May 31, 2018 (CN) .......................... 201810556363.1
Sep. 28, 2018 (CN) .......................... 201811142801.6

(51) Int. Cl.
*B60K 35/00* (2006.01)
*G06F 3/01* (2006.01)

(52) U.S. Cl.
CPC .............. *G06F 3/013* (2013.01); *B60K 35/00* (2013.01); *B60K 2370/12* (2019.05); *B60K 2370/1529* (2019.05); *B60K 2370/20* (2019.05)

(58) Field of Classification Search
None
See application file for complete search history.

(56) References Cited

U.S. PATENT DOCUMENTS

2013/0250415 A1\* 9/2013 Gupta .................. G02B 5/3041
359/489.09
2017/0059863 A1 3/2017 Kasazumi
(Continued)

FOREIGN PATENT DOCUMENTS

CN 106773058 A 5/2017
CN 108020920 A 5/2018
(Continued)

OTHER PUBLICATIONS

Extended European Search Report for the corresponding European Patent Application No. 19811615.4, dated Dec. 15, 2021. 8 pages.

*Primary Examiner* — Kent W Chang
*Assistant Examiner* — Benjamin Morales
(74) *Attorney, Agent, or Firm* — Leason Ellis LLP

(57) ABSTRACT

A head-up display system and display method, a vehicle, and a computer product. The head-up display system includes: a display device configured to output first linearly polarized light for displaying a first image in a first time intervals and output second linearly polarized light for displaying a second image in a second time intervals; and a polarization beam splitting element in an optical path of light exiting from the display device, being configured to deflect a propagation direction of the first linearly polarized light by a first angle and deflect a propagation direction of the second linearly polarized light by a second angle, and the first angle and the second angle are different from each other.

16 Claims, 9 Drawing Sheets

(56) References Cited

U.S. PATENT DOCUMENTS

| | | | | |
|---|---|---|---|---|
| 2018/0120562 A1* | 5/2018 | Yata | ................ | G02B 27/283 |
| 2018/0180878 A1* | 6/2018 | Yokoe | ................ | B60K 35/00 |
| 2018/0213210 A1* | 7/2018 | Sun | ................ | H04N 13/346 |
| 2019/0339531 A1* | 11/2019 | Ouyang | ............ | G02B 27/0972 |
| 2020/0201036 A1 | 6/2020 | Hong | | |

FOREIGN PATENT DOCUMENTS

| | | | | |
|---|---|---|---|---|
| CN | 108196367 A | 6/2018 | | |
| CN | 109298529 A | 2/2019 | | |
| KR | 20170132067 A | 12/2017 | | |
| WO | 2015125247 A1 | 8/2015 | | |
| WO | WO-2018000806 A1 * | 1/2018 | .......... | H04N 13/344 |
| WO | 2019184335 A1 | 10/2019 | | |

* cited by examiner

Relationship between reflectivity and incident angle

Incident angle (unit: degrees)

HEAD-UP DISPLAY SYSTEM AND DISPLAY METHOD, VEHICLE, HEAD-UP DISPLAY DEVICE, AND COMPUTER-READABLE STORAGE MEDIUM

CROSS-REFERENCE TO RELATED PATENT APPLICATIONS

This application is a U.S. National Stage Application under 35 U.S.C. § 371 of International patent Application No. PCT/CN2019/089439, filed May 31, 2019, which claims priority to Chinese patent application No. 201810556363.1, filed on May 31, 2018, and Chinese patent application No. 201811142801.6, filed on Sep. 28, 2018, all of which are incorporated herein by reference in their entireties as part of the present disclosure. The International Application was published on Dec. 5, 2019, as International Publication No. WO 2019/228488 A1.

TECHNICAL FIELD

Embodiments of the present disclosure relate to a head up display system, a head up display method, a vehicle, a head up display apparatus and a computer-readable storage medium.

BACKGROUND

Head up display (HUD), which is also referred to as head-up display and gradually and widely applied in the field of automobile. Head up display projects the information (such as speed information) displayed by an instrument and navigation information to the front windshield during the automobile travel process, so as to allow a driver to see the information displayed by the instrument without lowering his/her head. This not only helps novices who are inexperienced to judge the speed to control the speed of his/her car, avoids speeding violations in many speed limited road sections, but also helps the driver to instantly read information without shifting his/her line of sight under the condition of large field of view, keeps the best observation state with clear mind, and avoids the potential safety hazard caused by the rapid change of external environment when the driver lower his/her head to see information displayed by the instrument or an audio device. Along with the widespread application of the head up display system, users have higher and higher demands for the field of view of the head up display system, and a large field of view has become a development trend of the head up display system.

SUMMARY

Some embodiments of the present disclosure provide a head up display system, which comprises: a display control module configured to output first linearly polarized light for displaying a first image in a first time intervals and output second linearly polarized light for displaying a second image in a second time intervals; and a polarization beam splitting element in an optical path of light exiting from the display control module. The polarization beam splitting element is configured to deflect a propagation direction of the first linearly polarized light by a first angle and deflect a propagation direction of the second linearly polarized light by a second angle, and the first angle and the second angle are different from each other.

In some example, the first time intervals in which the display control module is configured to output the first linearly polarized light and the second time intervals in which the display control module is configured to output the second linearly polarized light are alternatively arranged.

In some example, a sum of one first time interval and one second time interval adjacent to each other is smaller than or equal to a response time for persistence of vision of human eyes; and output frequencies for the first time intervals and the second time intervals are both greater than or equal to two times of a refresh frequency of the persistence of vision of human eyes.

In some example, the display control module comprises: a display component configured to display the first image in the first time intervals and display the second image in the second time intervals; and a first polarization conversion element at an image display side of the display component. The first polarization conversion element is configured to convert light of the first image into the first linearly polarized light in the first time intervals and to convert light of the second image into the second linearly polarized light in the second time intervals, and a vibration direction of the first linearly polarized light and a vibration direction of the second linearly polarized light are perpendicular to each other.

In some example, the head up display system further comprises at least one reflector. The at least one reflector is at an optical path between the display control module and the polarization beam splitting element, and is configured to change propagation directions of the first linearly polarized light and the second linearly polarized light.

In some example, the reflector comprises at least one selected from the group consisting of a plane reflector, a spherical reflector, an aspheric reflector and a freeform reflector.

In some example, the head up display system comprises one non-planar reflector; or, the head up display system comprises at least two reflectors which include at least one non-planar reflector.

In some example, the polarization beam splitting element comprises a polarization splitting prism; and the polarization splitting prism comprises two right angle prisms, optical axis directions of which are perpendicular to each other.

In some example, the polarization beam splitting element comprises one polarization splitting prism; or, the polarization beam splitting element comprises at least two polarization splitting prisms, the at least two polarization splitting prisms are stacked with each other, and for two adjacent polarization splitting prisms, right angle prisms with the same optical axis direction are in contact with each other.

In some example, the head up display system further comprises: a first optical element in an optical path of the first linearly polarized light after the first linearly polarized light being deflected, and a second optical element in an optical path of the second linearly polarized light after the second linearly polarized light being deflected; and the first optical element is configured to reflect the first linearly polarized light into human eyes, and the second optical element is configured to reflect the second linearly polarized light into the human eyes.

In some example, each of the first optical element and the second optical element comprise a holographic optical element.

In some example, the first optical element and the second optical element are at a windshield or a combiner of a vehicle with the head up display system.

In some example, the display control module further comprises an image rendering component connected with the display component; and the image rendering component is configured to output the first image in the first time intervals, and to output the second image in the second time intervals.

In some example, the display control module further comprises a system control component connected with the image rendering component and the first polarization conversion element; and the system control component is configured to control a time sequence and a frequency of outputting the first image and the second image output by the image rendering component, and to control the first polarization conversion element to perform polarization conversion to the light of the first image and the light of the second image.

In some example, the display control module further comprises an aberration compensation circuit; and the aberration compensation circuit is respectively connected with the system control component and the image rendering circuit, and the aberration compensation circuit is configured to compensate an aberration introduced by a light angle changing element in the head up display system, and to input an aberration compensation signal into the image rendering component.

In some example, the display control module further comprises a collimator which is at a light-exiting side of the display component and configured to collimate light that is output by the display component; and the light angle changing element comprises at least one of the polarization beam splitting element and the collimator.

In some example, the head up display system further comprise a second polarization conversion element at a light-exiting side of the polarization beam splitting element; and the second polarization conversion element is configured to convert the first linearly polarized light into the second linearly polarized light, or convert the second linearly polarized light into the first linearly polarized light.

In some example, the second polarization conversion element is further configured to: under a control of the display control module, change a polarization direction of the first linearly polarized light exited from the polarization beam splitting element into a polarization direction the same as that of the second linearly polarized light in the first time intervals and not change a polarization direction of the second linearly polarized light exited from the polarization beam splitting element in the second time intervals; or, not change the polarization direction of the first linearly polarized light exited from the polarization beam splitting element in the first time intervals, and change the polarization direction of the second linearly polarized light exited from the polarization beam splitting element into a polarization direction the same as that of the first linearly polarized light in the second time intervals.

Some embodiments of the present disclosure provide a head up display method, which comprises a plurality of display periods, and each display period comprises a first time interval and a second time interval. In the first time interval, first linearly polarized light for displaying a first image is output, a propagation direction of the first linearly polarized light is deflected by a first angle, and the first linearly polarized light is reflected into human eyes; in the second time interval, second linearly polarized light for displaying a second image is output, a propagation direction of the second linearly polarized light is deflected by a second angle, and the second linearly polarized light is reflected into the human eyes; and the first angle and the second angle are different from each other.

In some example, the first angle by which the first linearly polarized light is deflected and the second angle by which the second linearly polarized light is deflected are different from each other, so that display regions of the first image and the second image to be different and arranged along a pre-determined direction.

In some example, the pre-determined direction is a direction that is parallel with or perpendicular to a line connecting two eyes of a user.

In some example, a time length of the each display period is smaller than or equal to a response time of persistence of vision of human eyes, and output frequencies for the first time interval and the second time interval are both greater than or equal to two times of a refresh frequency of the persistence of vision of human eyes.

In some example, in the first time interval, after the propagation direction of the first linearly polarized light is deflected by the first angle and before the first linearly polarized light is reflected into the human eyes, the method further comprises: change a polarization direction of the first linearly polarized light into a polarization direction as that same as that of the second linearly polarized light; or, in the second time interval, after the propagation direction of the second linearly polarized light is deflected by the second angle and before the second linearly polarized light is reflected into the human eyes, the method further comprises: changing a polarization direction of the second linearly polarized light into a polarization direction the same as that of the first linearly polarized light.

Some embodiments of the present disclosure provide a vehicle, which comprises any one of the above head up display systems.

Some embodiments of the present disclosure provide a head up display apparatus, which comprises: a memory configured to store non-transitory computer-readable instructions; and a processor configured to run the non-transitory computer-readable instructions. Upon the processor running the non-transitory computer-readable instructions, any one of the above head up display methods is performed.

Some embodiments of the present disclosure provide a computer-readable storage medium, configured to store non-transitory computer-readable instructions; upon a computer running the non-transitory computer-readable instructions, any one of the above head up display methods is performed.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
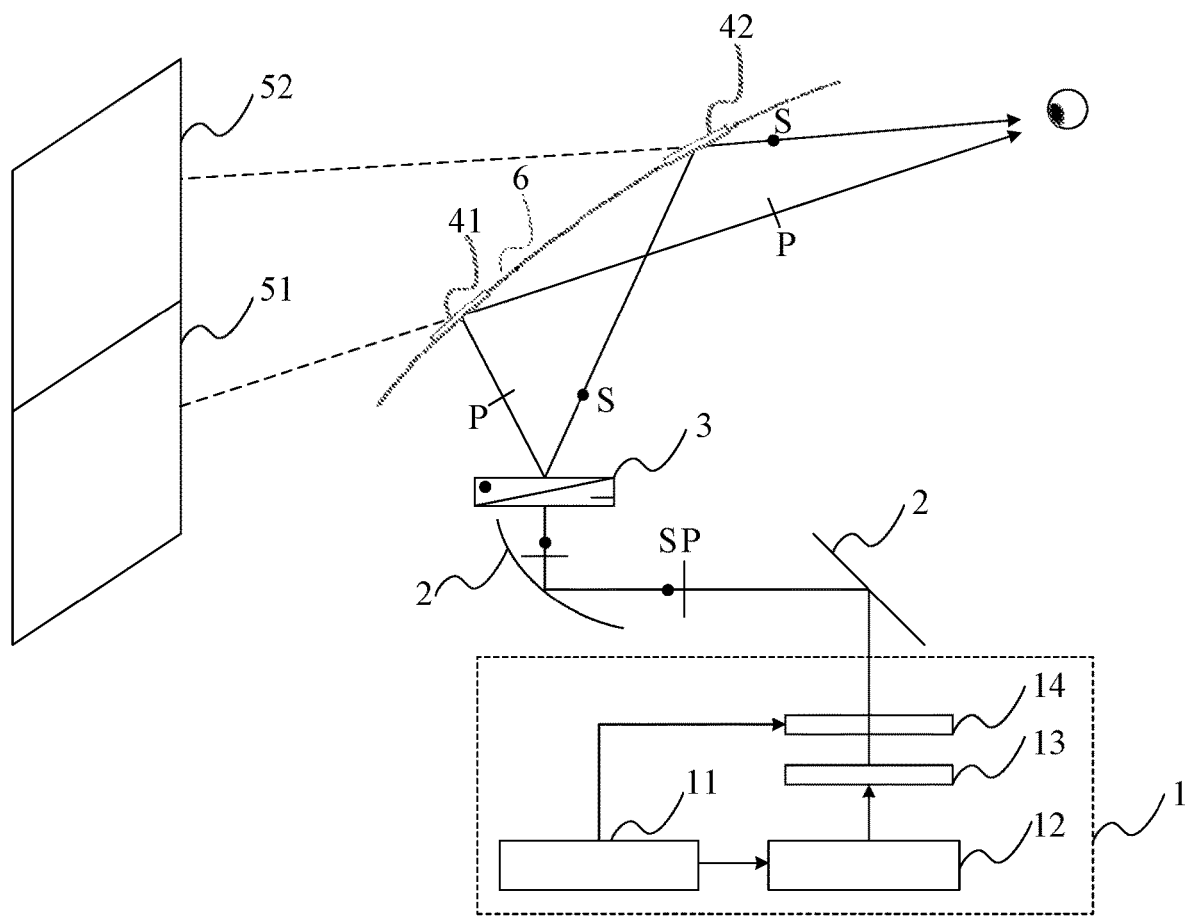
FIG. 1 is a schematically structural view of a head up display system provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

As described in the background technology, in the current head up displays, a two dimensional (2D) display image is usually projected to a position in front of a driver with the distance between the position and the driver to be fixed. When viewing the content displayed by the head up display, the driver needs to adjust the focal length of his/her eyes to make his/her eyes focus on the imaging surface of the 2D display image. In order to avoid the safety problems caused by the frequent adjustment of the focal length of the eyes of the driver, the head up display system of related technologies adopts a double projection technical scheme, which divides the display image into a region for displaying status information and a region for displaying augmented reality display information. The status information refers to the information of vehicle status such as vehicle speed, oil temperature, water temperature, etc., and is displayed at a position about two meters away from the driver's eyes; the augmented reality information, such as the indication information of external objects, navigation indication information, etc., is displayed at a position which is further away from the driver's eyes, such as 5 to 8 meters from the driver's eyes, this distance allows the significant adjustment of the focal length of human eyes to be unnecessary, and allows the human eyes to be comfortable to watch. In the double projection technical scheme, the projection distance of the augmented reality information is relatively large, and it is necessary to ensure that the user can see complete information when the user's head moves in a certain range, that is, the field of view with a certain size is needed, and therefore, a reflector with large aperture needs to be used to ensure that the field of view is large. Because most of the reflectors in the head up display system adopt a free-form surface, it is difficult to manufacture free-form surface reflectors with a large aperture; the reflectors with a large aperture make the volume of the head up display system relatively large; all of the above factors limit the development of the head up display system with a large field of view.

Based on the above situation, the technical solution of the present disclosure provides a head up display system, a head up display method, and the head up display system realizes display in a larger field of view through using a polarization beam splitting element to deflect light and adopting a time division multiplexing method.

Please refer to FIG. 1, an embodiment of the present disclosure disclose a head up display system, the head up display system can display a first image 51 and a second image 52 in each display period, and each display period comprises a first time interval and a second time interval. The head up display system comprises: a display control module 1 and a polarization beam splitting element 3. The display control module 1 is configured to output first linearly polarized light P required by the first image 51 in the first time intervals, and to output second linearly polarized light S required by the second image 52 in the second time intervals; the polarization beam splitting element 3 is at the light-outputting optical path of the display control module 1, and is configured to deflect the propagation direction of the first linearly polarized light P by a first angle, and to deflect the propagation direction of the second linearly polarized light S by a second angle; the first linearly polarized light P and the second linearly polarized light S are respectively configured to display the first image 51 and the second image 52. For example, the first angle and the second angle are different from each other.

In the present embodiment, the display control module 1 outputs the first linearly polarized light P and the second linearly polarized light S at different time intervals according to time sequence, the first linearly polarized light P and the second linearly polarized light S pass the polarization beam splitting element 3, and deflection of light propagation angle is occurred; after leaving the polarization beam splitting element 3, the first image 51 and the second image 52 can be displayed at different positions with the first linearly polarized light P and the second linearly polarized light S that are deflected. The head up display system in the present embodiment uses the polarization beam splitting element 3 to produce different light deflection angles for the first linearly polarized light P and the second linearly polarized light S, which provides a prerequisite for displaying images through a time division multiplexing method. By controlling, through the display control module 1, the output time sequence and frequency of images displayed with the first linearly polarized light P and the second linearly polarized light S, the first image 51 and the second image 52 are alternatively displayed; at the same time, the persistence of vision of human eyes is used to allow the human eyes to simultaneously see the first image 51 and the second image

52, such that the image display region of the head up display system is enlarged and display with a larger field of view is realized.

For example, the above-mentioned first angle and second angle are different, so as to allow the first image and the second image to be able to be displayed at different display regions to enlarge field of view. For example, the description that the first angle and the second angle are different here can comprises that the deflection directions of the propagation directions are different, or the deflection angles of the propagation directions are different, or both of the deflection directions and deflection angles of the propagation directions are different.

It should be noted that, in the case where light passes the surface of an optical component (e.g., beam splitting mirror) with a non-vertical angle, both the reflection and transmittance characteristics of the light depends on polarization phenomenon. In this case, the coordinate system is defined through a plane including the incident light and the reflected light. If the polarization vector of the light is in the above plane, the light is p-polarized; if the polarization vector of the light is perpendicular to the above plane, the light is s-polarized. The first linearly polarized light P in an embodiment of the present disclosure is corresponding to p-polarized light, while the second linearly polarized light S is corresponding to s-polarized light.

Please refer to FIG. 1, in some embodiments, the display control module 1 comprises an image rendering component 12, a display component 13, a polarization conversion element 14 and a system control component 11. The image rendering component 12 is configured to output the first image 51 during the first time interval, and to output the second image 52 during the second time interval; the display component 13 is connected with the image rendering component 12, and is configured to display the first image 51 and the second image 52; the polarization conversion element 14 is at the image display side of the display component 13, and is configured to convert the light of the first image 51 into the first linearly polarized light P in the first time interval, and to convert the light of the second image 52 into the second linearly polarized light S in the second time interval, and the vibration directions of the first linearly polarized light P and the second linearly polarized light S are perpendicular to each other; the system control component 11 is connected with the image rendering component 12 and the polarization conversion element 14, and is configured to control the time sequence and frequency of outputting the first image 51 and the second image 52 output by the image rendering component 12, and to control the polarization conversion element 14 to perform polarization conversion to the light of the first image 51 and the light of the second image 52.

The display control module 1 controls the image rendering component 12 to output, according to certain time sequence and frequency, the required images to the display component 13 based on the polarization state of the light converted by the polarization conversion element 14; the light of the image displayed by the display component 13 is incident on the polarization conversion element 14, and the polarization conversion element 14 converts the light of the image into the first linearly polarized light P or the second linearly polarized light S through converting the polarization state of the light under the control of the system control unit and then outputs the light. Through the combined action of the components in the display control module 1, conversion of light into the first linearly polarized light P and the second linearly polarized light S, and respectively outputting the first linearly polarized light P and the second linearly polarized light S according to certain time sequence and frequency are realized.

In some embodiments, the head up display system further comprises at least one reflector 2 at the optical path between the display control module 1 and the polarization beam splitting element 3 (please refer to FIG. 1), and is configured to change the propagation directions of the first linearly polarized light P and the second linearly polarized light S. Through allowing the reflector 2 to be at the optical path between the display control module 1 and the polarization beam splitting element 3, the propagation distance of the optical path can be effectively shortened, such that the spacing occupied by the head up display system can be reduced.

The type and number of the reflector 2 adopted can be adjusted according to specific implementation demands. The reflector 2 comprises at least one of a plane reflector, a spherical reflector, an aspheric reflector or a freeform reflector. In implementation, the head up display system may comprise one non-planar reflector, for example, one freeform reflector, or one spherical reflector is provided. The reflector 2 is set according to the required field of view and imaging distance; if the field of view is relatively large, and the imaging distance is relatively large, a plurality of reflectors 2 are generally required to perform correction of optical aberration, and thus, the head up display system may also comprise two or more reflectors 2, in which at least one non-planar reflector is adopted. For example, two reflectors 2 are provided in the head up display system, in which one reflector is a plane reflector, and the other reflector is an aspheric reflector; for another example, three reflectors 2 are provided in the head up display system, in which one reflector is spherical reflector, another reflector is an aspheric reflector, and the third reflector is a freeform reflector. No matter how many reflectors 2 are provided, at least one non-planar reflector is adopted, such that the reflector 2 is allowed to have focal power, and the entire optical system is allowed to have an image magnification function.

For the head up display system provided with the reflector 2, because the head up display system provided by an embodiment of the present disclosure is provided with the polarization beam splitting element 3, and a display method based on time division multiplexing is adopted, the present embodiment can realize display with a larger field of view by adopting a reflector 2 with the aperture of which to be the same as that of prior art. Correspondingly, those skilled in the art can draw the conclusion, according to the technical solution provided by an embodiment of the present disclosure, that imaging with the head up display system provided by an embodiment of the present disclosure can allow adoption of a smaller reflector 2 in the case where the display field of view required by a user is the same. The size of the reflector 2 adopted in related art is generally determined by the field of view of the head up display system and the distance of displayed image. In an example, in the case where the field of view is 10×5 degrees, and the imaging distance is 7.5 m, the aperture of the reflector 2 adopted in related art is 320 cm×160 cm, while the head up display system of the present disclosure can adopt the reflector 2 with the size equal to 160 cm×80 cm, and thus the size of the aperture of the reflector 2 is apparently reduced. Therefore, an embodiment of the present disclosure can effectively avoid the size of the optical reflector 2 being too large, and the optical reflector 2 being difficult to manufacture, fabricate and test in the head up display system with a large field of view, and can effectively reduce the cost and the volume of the head up display system, and the spacing occupied by the head up display system, which is in favor of setting the head up display system in vehicle such as vehicle.

For example, in an embodiment of the present disclosure, the reflector is at the optical path between the display control module and the polarization beam splitting element, that is, a reflector with a relatively small aperture can be used before the light is deflected by the polarization beam splitting element toward different directions, so as to obtain a relatively large field of view.

Figure 2:
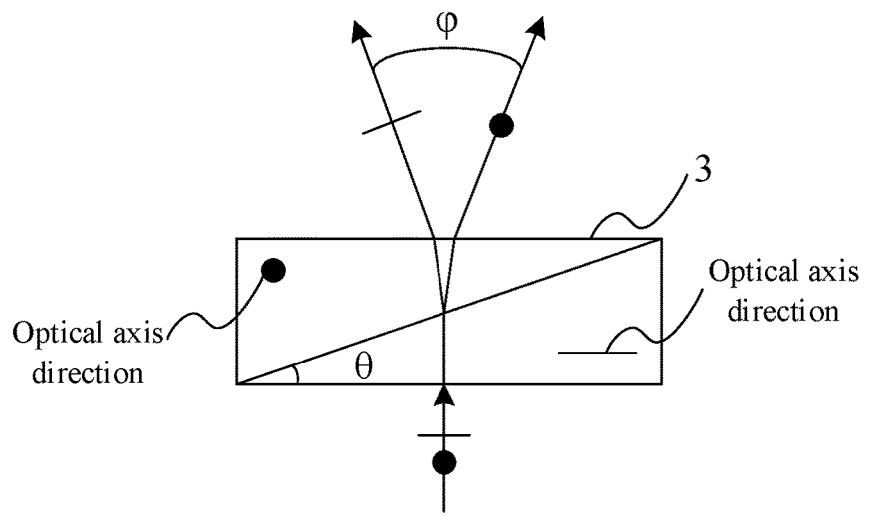
FIG. 2 is a schematically structural view of a polarization beam splitting element provided by an embodiment of the present disclosure.

In some embodiments, the polarization beam splitting element 3 comprises a polarization splitting prism, and the polarization splitting prism comprises two right angle prisms, the optical axis directions of which are perpendicular to each other. The polarization splitting prism is configured to separate light with two different polarization states, and the polarization splitting prism is generally a light splitting prism made of material with birefringence, such as Wollaston prism and the like. The material of Wollaston prism is calcite, and calcite is a birefringence crystal material. Please refer to FIG. 2, Wollaston prism is an optical device, which can produce two separated beams of linearly polarized light, the vibration directions of which are perpendicular to each other. Wollaston prism includes two right angle prisms, and the optical axis directions of the two right angle prisms are perpendicular to each other. The short dashes and the dots as illustrated in FIG. 2 respectively represent two optical axis directions that are perpendicular to each other. In the case where the vertex angle of the right angle prism is θ, the angle φ between two outputted beams of polarized light can be estimated by the following equation:

$$\varphi = 2\sin^{-1}[(n_o - n_e)\tan\theta]$$

where $n_o$ and $n_e$ are respectively the refractive index of ordinary light and the refractive index of extraordinary light in calcite, and calcite is a negative crystal material, and $n_o > n_e$.

Figure 3:
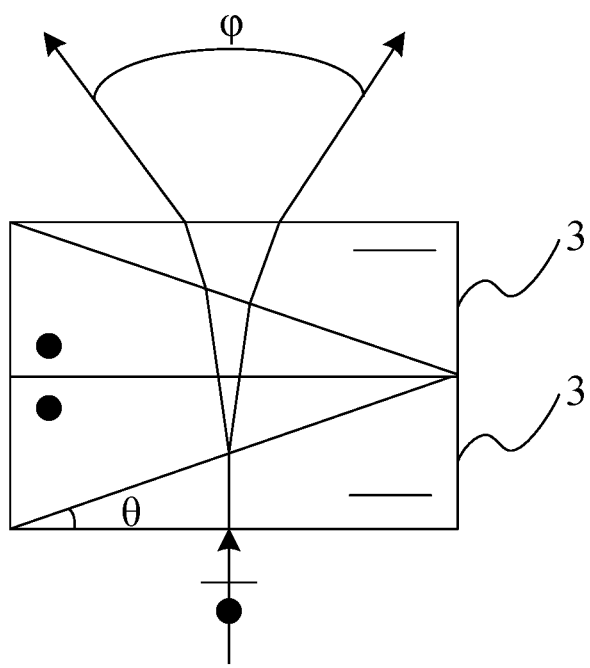
FIG. 3 is a schematically structural view of another polarization beam splitting element provided by an embodiment of the present disclosure.

In some embodiments, the polarization beam splitting element 3 may comprise one polarization splitting prism as illustrated in FIG. 2, or, may adopt a setting mode with two or more polarization splitting prism being stacked with each other, so as to further enlarge the separation angle between the light with two kinds of polarization states. Please refer to FIG. 3, for two adjacent polarization splitting prism s, the right angle prisms with the same optical axis direction are in contact with each other. As can be seen from the figure, the angle between the light with two kinds of polarization states is enlarged after the light with two kinds of polarization states passes two polarization splitting prisms. It should be noted that, in the case where the incident light is refracted (refraction is divided into light refraction at the internal interface of a birefringent material and light refraction at the interface between the birefringent material and the air) at two interfaces where refraction is present, the polarization splitting prisms cannot be further stacked when the incident angle is greater than the total reflection angle. The total reflection angle is as follows:

$$\alpha = \min\left(\sin^{-1}\frac{n_e}{n_o}, \sin^{-1}\frac{1}{n_o}, \sin^{-1}\frac{1}{n_e}\right).$$

In some embodiments, the head up display system further comprises a first optical element and a second optical element, and the first optical element 41 is at the optical path of the first linearly polarized light P that is deflected, and is configured to reflect the first linearly polarized light P to human eyes; the second optical element 42 is at the optical path of the second linearly polarized light S that is deflected, and is configured to reflect the second linearly polarized light S to the human eyes. The first optical element 41 and the second optical element 42 comprise a holographic optical element. The holographic optical element is an optical diffractive element fabricated through using the principle of optical interference, and the holographic optical element can add a reverse aberration on the incident light with aberration, so as to eliminate the aberration produced by the original optical system. At the same time, the holographic optical element can control the diffraction angle of the incident light which passes the holographic element, so as to obtain a desired diffraction angle. Compared with a common reflection element with equal incident angle and outgoing angle, the holographic optical element can reflect the light to a specific angle. The selection of the holographic optical element is based on the desired diffraction angle and the aberration of the incident light, so as to satisfy the requirement of correcting the aberration and obtain the desired diffraction angle. The use of the holographic element can eliminate the chromatic aberration produced by the polarization beam splitting element 3 or other aberrations existing in the optical path of the head up display system (other aberrations caused by the processing error of the optical components in the optical system or the optical path itself, which may comprise the spherical aberration, the coma aberration, the astigmatism, the field curvature and the distortion), and reflect the light into the human eyes according to a pre-determined angle, so as to allow a driver can see the first image 51 and the second image 52, and the distance between the first image 51 and the human eyes and the distance between the second image 52 and the human eyes are the same. For example, the first optical element 41 and the second optical element 42 comprise a holographic grating. For example, the holographic grating is fabricated by taking base grating as a raw material and undergo a process similar to that of ruled grating. A base holographic grating is generally fabricated through exposing a photosensitive material in the interference light formed by two beams of laser beam. The interference pattern appears as a periodic pattern on a surface of the photosensitive material, and the surface pattern can be revealed through physical or chemical treatment.

The first optical element 41 and the second optical element 42 can be provided, as illustrated in FIG. 1, at the windshield 6 of the vehicle where the head up display system is located; obviously, the first optical element 41 and the second optical element 42 can be provided at a combiner or other suitable component.

In some embodiments, the time length of each display period is smaller than or equal to the response time (0.1 to 0.4 seconds) of the persistence of vision of human eyes; the output frequencies for the first time intervals and the second time intervals are both greater than or equal to two times of the refresh frequency of the persistence of vision of human eyes. In the first time intervals, the first image 51 is displayed while the region for displaying the second image 52 do not have an image; correspondingly, in the second time intervals, the second image 52 is displayed, while the region for displaying the first image 51 do not have an image. Through allowing the time length of each display period to be smaller than or equal to the response time of the persistence of vision of human eyes, and allowing the output frequencies for the first time intervals and the second time intervals to be both greater than or equal to the refresh frequency of the persistence of vision of human eyes, the advantage of combining time division multiplexing method and the characteristic of the persistence of vision of human eyes can be fully used. Image alternation is performed according to a frequency which is greater than the refresh frequency of the persistence of vision of human eyes, and the display component 13 displays the first image 51 and the second image 52 alternatively, meanwhile, the polarization conversion element 14 performs the polarization state conversion to the light according to the same frequency, such that the first image 51 displayed by the first linearly polarized light P is outputted in the first time intervals, and the second image 52 displayed by the second linearly polarized light S is outputted in the second time intervals. Even though the above two images are not outputted at the same time, human eyes can see both of the above displayed images when the above two images are alternatively outputted with a high frequency because of the persistence of vision of human eyes, such that a display image with a large field of view can be formed.

Figure 4:
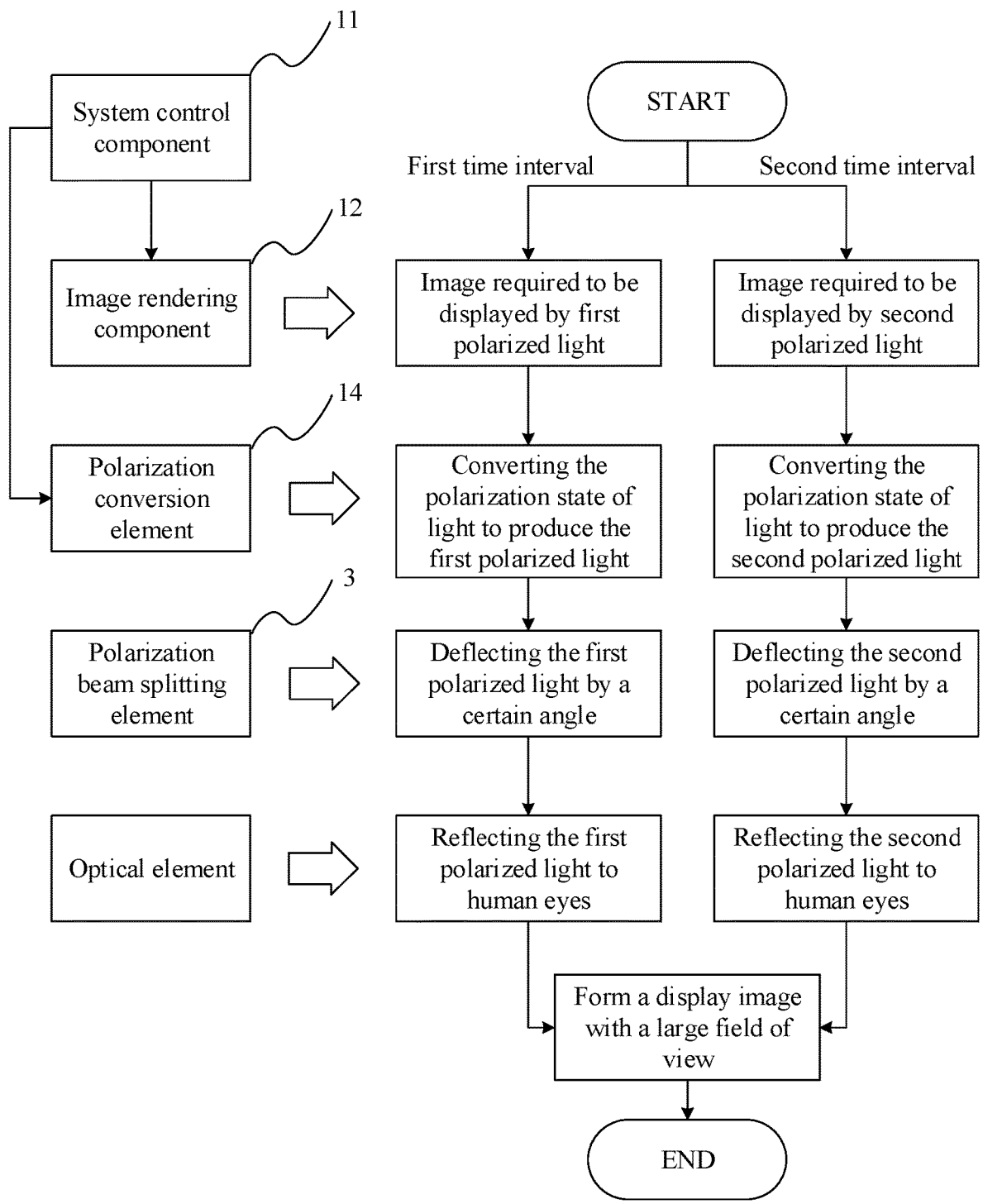
FIG. 4 is a flow chart of a head up display method provided by an embodiment of the present disclosure.

Please refer to FIG. 4, an embodiment of the present disclosure further provides a head up display method which comprises a plurality of display periods, and each display period comprises a first time interval and a second time interval. In the first time intervals, first linearly polarized light P required by the first image 51 to be displayed is outputted, the propagation direction of the first linearly polarized light P is deflected by a first angle, and the first linearly polarized light P is reflected into human eyes; in the second time intervals, second linearly polarized light S required by the second image 52 to be displayed is outputted, the propagation direction of the second linearly polarized light S is deflected by a second angle, and the second linearly polarized light S is reflected into human eyes.

Exemplarily, as illustrated in FIG. 4, at the beginning of a display period, firstly, in the first time intervals, the system control component 11 in the display control module 1 controls the image rendering component 12 to generate the image required to be displayed by the first linearly polarized light P on the display component. The system control component 11 controls the polarization conversion element 14 to convert the polarization state of the light passing the polarization conversion element 14 into the polarization state of the first linearly polarized light P; after being reflected by the reflector 2, the first linearly polarized light P enters the polarization beam splitting element 3, and the first linearly polarized light P is deflected by a certain angle after the first linearly polarized light P passes the polarization beam splitting element 3, and enters into the human eyes via the first optical element 41, so as to allow the human eyes to see the first image 51. In the second time intervals, the processing as described in the first time intervals is performed to the image displayed by the second linearly polarized light S, so as to allow the human eyes to see the second image 52. The human eyes see both of the first image 51 and the second image 52 in the case where time division multiplexing is adopted, and a display image with a large field of view is formed.

For example, the display component 13 may be an organic light-emitting diode display component, a liquid crystal display component, etc., and no specific limitation will be given in an embodiment of the present disclosure.

The advantages of the above-mentioned head up display method is the same as the advantages of the head up display system in the present embodiment and no further description will be given here.

Figure 5:
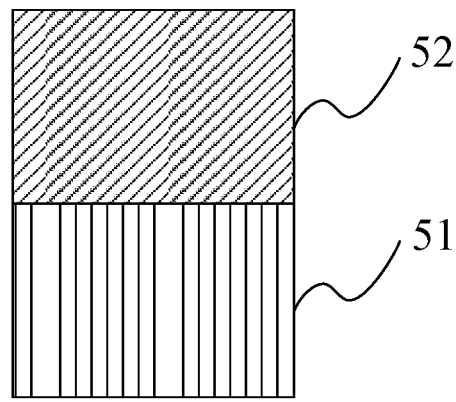
FIG. 5 is a schematic diagram of a display image observed by a driver using a head up display system provided by an embodiment of the present disclosure.
Figure 6:
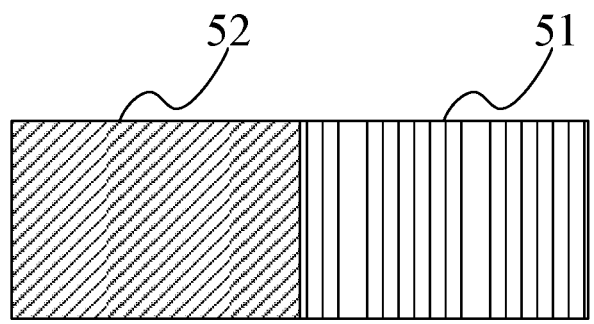
FIG. 6 is a schematic diagram of another display image observed by a driver using a head up display system provided by an embodiment of the present disclosure.

Through adjusting the deflection direction of the first linearly polarized light P and the second linearly polarized light S, a display image with a large field of view can be displayed at the vertical direction or the horizontal direction. As illustrated in FIG. 1 and FIG. 5, the first linearly polarized light P and the second linearly polarized light S are deflected along the vertical direction towards opposite directions, so as to display the first image 51 and the second image 52 arranged along the vertical direction. When keeping the plane where the bottom surface of the polarization beam splitting element 3 in FIG. 1 unchanged, and allowing the polarization beam splitting element 3 to rotate 90° clockwise/counter clockwise, the first linearly polarized light P and the second linearly polarized light S can be deflected along the horizontal direction towards opposite directions, so as to display the first image 51 and the second image 52 (as illustrated in FIG. 6) arranged along the horizontal direction.

For example, displaying of the first image 51 and the second image 52 at different display regions can allow the first image 51 and the second image 52 to be arranged along a pre-determined direction, such that the first image 51 and the second image 52 can be combined into a relatively large image so as to enlarge the field of view. In some examples, the first image 51 and the second image 52 can be partially overlapped, or connected with each other but not overlapped, or a certain distance is provided between the first image 51 and the second image 52. For example, no specific limitation will be given to the pre-determined direction along which the above-mentioned first image 51 and second image 52 are arranged. For example, the pre-determined direction can be a direction parallel with or perpendicular to a line connecting the eyes of a user.

In executing the above-mentioned head up display method, the time length of each display period is smaller than or equal to the response time of the persistence of vision of human eyes, and the output frequencies for the first time intervals and the second time intervals are both greater than or equal to two times of the refresh frequency of the persistence of vision of human eyes.

Some embodiment of the present disclosure further provides a head up display system which may comprise: a control element 110, a display source 120, a first polarization conversion element 130, an optical path separator 140, a first reflector 150, a second reflector 150', a collimator 160, an image rendering circuit 170 and an aberration compensation circuit 180. Further, in FIG. 7, the view position of a driver of a motor vehicle is schematically illustrated through using a human eye. Further, it should be noted that, in FIG. 7, the propagation path of the light outputted by the display source 120 in the entire system is illustrated with arrows. However, it should be understood that, the positions of the components with respect to the propagation path of the light does not construed as any limitation to the present disclosure, and those skilled in the art can flexibly arrange the components according to needs without departure from the spirit and principle of the present disclosure.

For example, the display source 120 in the present embodiment may be a display component, and the control element 110 may be a system control component, and the optical path separator 140 may be a polarization beam splitting element.

Those skilled in the art should understood that, the windshield 100 is a half transparent and half reflective element (transflective element). Any half transparent and half reflective element which can reflect the first linearly polarized light and the second linearly polarized light to the eyes of a user and allow an image to be formed in the eyes of the user can work with the head up display system in the present disclosure. For example, the head up display system of the present disclosure can also be applied in a train, or an aerobat (for example, an aircraft).

Figure 7:
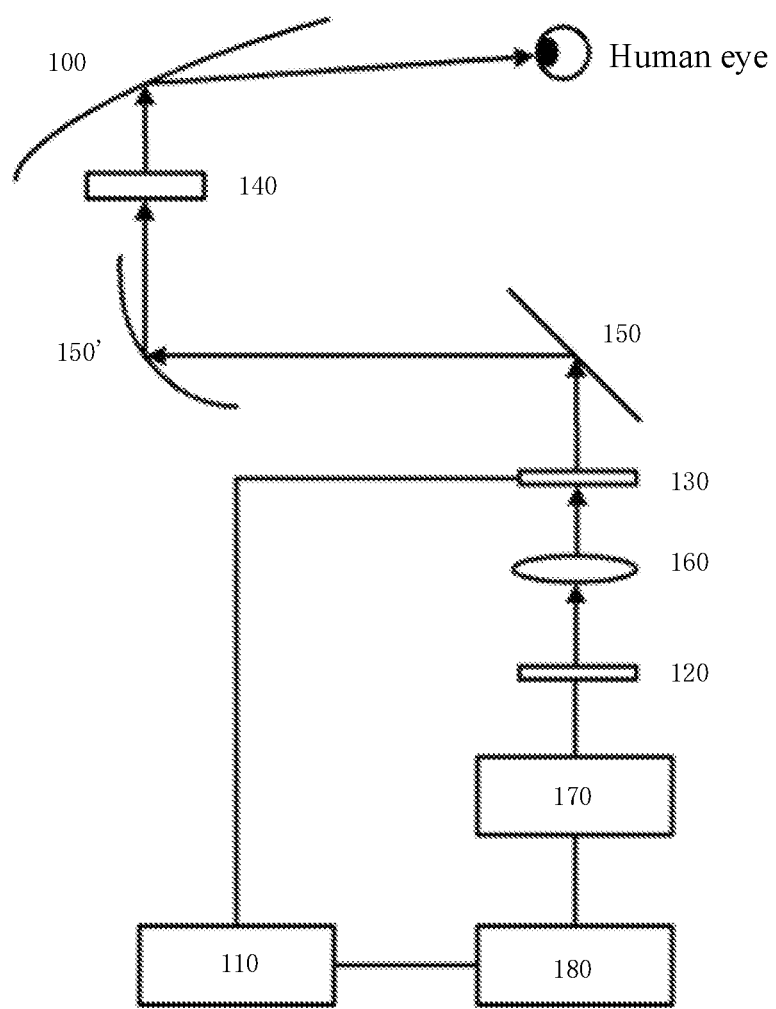
FIG. 7 is a schematically structural view of a head up display system provided by an embodiment of the present disclosure.

Further to refer FIG. 7, the components in and the principle of the head up display system according to an embodiment of the present disclosure will be briefly described now.

In the head up display system, the display source 120 can be configured to emit coded light, that is, display information can be encoded into the light emitted by the display source 120. The above display information can be generated by the image rendering circuit 170 and inputted into the display source 120. Further, the image rendering circuit 170 can also receive an aberration compensation signal from the aberration compensation circuit 180 which is optionally provided. The aberration compensation signal is configured to compensate the aberration generated during the propagation of the light emitted by the display source 120 in the entire system (for example, the aberration caused by a light angle changing element). For example, the light angle changing element comprises but not limited to an optical path separator and a collimator.

The time division multiplexing process in the head up display system will be described in the following. The time division multiplexing is realized with the help of the control element 110. Specifically, the control element 110 controls the entire head up display system during the first time sequence period and the second time sequence period which are alternatively provided. Specifically, the control element 110 controls the first polarization conversion element 130, and allows the user (for example, the driver of a motor vehicle) to be able to see linearly polarized light containing different display information respectively at the first time sequence period and the second time sequence period. In an implementation of the present embodiment, the first polarization conversion element 130 may be a combined element of a polarizer and an electro-optic crystal element.

The above time sequence control process will be described in detail in the following with reference to the control element 110, the first polarization conversion element 130 and the image rendering circuit 170. As an example, in the first time sequence period, the control element 110 may control the first polarization conversion element 130 to receive collimated light from the collimator 160, and convert the collimated light into the first linearly polarized light. In this case, as an optionally example, the control element 110 may further control the image rendering circuit 170 in the first time sequence period, so as to allow the image rendering circuit 170 to generate first display information and provide the first display information to the display source 120. Therefore, the display source 120 generates light containing the first display information in the first time sequence period. In this case, in consideration of the control of the first polarization conversion element 130 by the control element 110 as described above, in the first time sequence period, the first linearly polarized light outputted from the first polarization conversion element 130 contains the first display information.

By similar ways, in the second time sequence period, the control element 110 may control the first polarization conversion element 130 to receive collimated light from the collimator 160, and convert the collimated light into the second linearly polarized light, the polarization direction of which is perpendicular to the above-mentioned first linearly polarized light. In this case, as an optionally example, the control element 110 may further control the image rendering circuit 170 in the second time sequence period, allow the image rendering circuit 170 to generate second display information which is different from the above-mentioned first display information, and provide the second display information to the display source 120. Therefore, similar to the first time sequence period, the display source 120 generates light containing the second display information in the second time sequence period. In this case, further, in consideration of the control of the first polarization conversion element 130 by the control element 110 as described above, in the second time sequence period, the second linearly polarized light outputted from the first polarization conversion element 130 correspondingly contains the second display information.

Optionally, in the head up display system provided by an embodiment of the present disclosure, the collimator 160 may further be configured to compensate system aberration. For example, because a diffractive optical component has an aberration characteristic that is opposite to that of a refractive prism, in the above collimator 160, the aberration can be compensated with a diffractive optical component. For example, a multilayer diffractive optical (DO) lens may be adopted.

As an example, the first display information may be selected as vehicle status information, such as vehicle speed, oil temperature, water temperature, etc., and the second display information may be selected as augmented reality information, such as external object indication information, navigation information, etc.

Thus, it can be seen, the time division multiplexing of the entire head up display system is realized with the help of the control of the first polarization conversion element 130 and the image rendering circuit 170 by the control element 110. This means that, in the case where the head up display system is working normally, the first polarization conversion element 130 provides two kinds of linearly polarized light, the polarization directions of which are perpendicular to each other, respectively in the first time sequence period and the second time sequence period, such as s-polarized light and p-polarized light, and the above two kinds of linearly polarized light may also contain different display information respectively.

Along the propagation path of the light, after leaving the first polarization conversion element 130, the first linearly polarized light or the second linearly polarized light are incident on the optical path separator 140 respectively via optional first reflector 150 and second reflector 150'. Here, it should be noted that, two reflectors 150, 150' can also be omitted according to needs, or the number of reflectors can be more or can be less, for example, can be one, three, etc. Generally, incorporating of one or a plurality of reflectors 150, 150' is in favor of realizing flexible folding of the optical path in the entire system, such that the volume of the spacing that can be occupied by the system is further reduced.

The reflectors 150 and 150' comprise at least one of a plane reflector, a spherical reflector, an aspheric reflector or a freeform reflector. In an implementation, the head up display system may comprise one non-planar reflector, for example, one freeform reflector, or one spherical reflector is provided. The reflector is set according to the required field of view and imaging distance; if the field of view is relatively large, and the imaging distance is relatively large, a plurality of reflectors are generally required to perform correction of optical aberration, and thus, the head up display system may also comprise two or more reflectors, in which at least one non-planar reflector is adopted. For example, two reflectors are provided in the head up display system, in which one reflector is a plane reflector, and the other reflector is an aspheric reflector; for another example, three reflectors are provided in the head up display system, in which one reflector is spherical reflector, another reflector is an aspheric reflector, and the third reflector is a freeform reflector. No matter how many reflectors are provided, at least one non-planar reflector is adopted, such that the reflector is allowed to have focal power, and the entire optical system is allowed to have an image magnification function.

Figure 8:
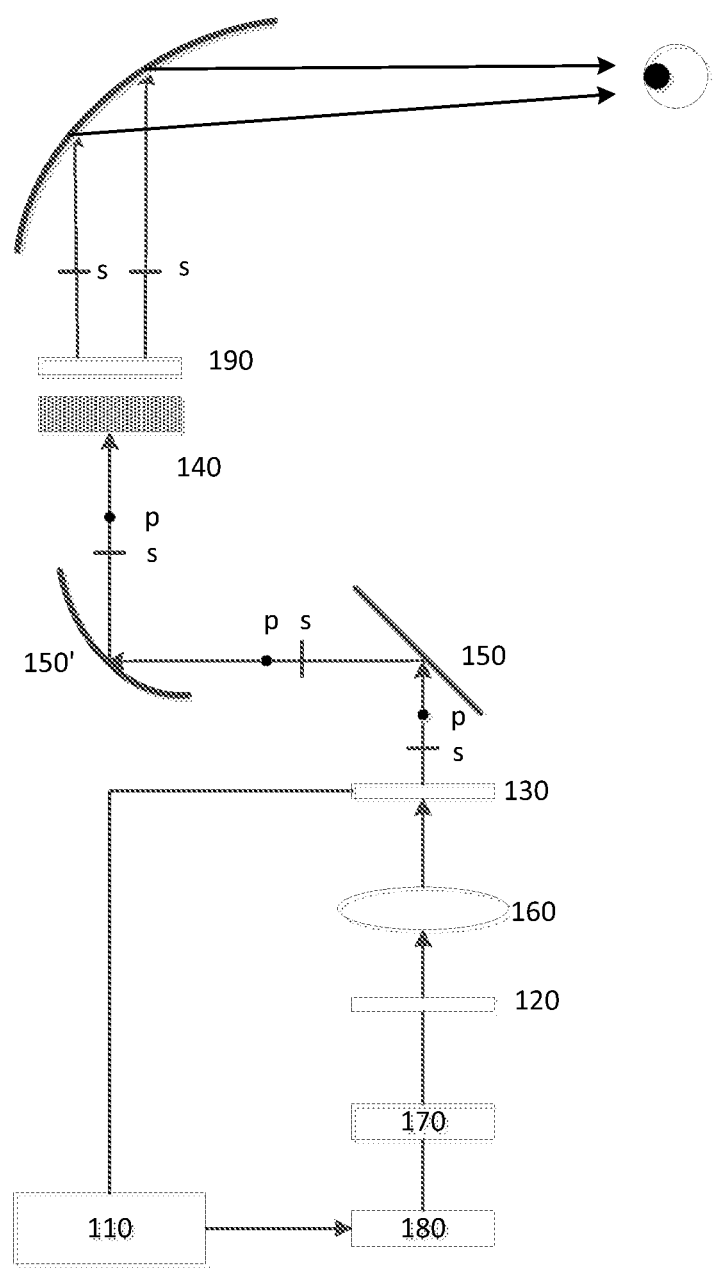
FIG. 8 is a schematically structural view of a head up display system, that is equipped with a second polarization conversion element, provided according to an embodiment of the present disclosure.

FIG. 8 schematically illustrates a schematic diagram of the head up display system, which is incorporated with a second polarization conversion element 190, according to an embodiment of the present disclosure. After the light passes the optical path separator and before the light is incident on the windshield 100, the second polarization conversion element 190 is provided, under the control of the control element 110, the second polarization conversion element 190 does not change the polarization state of s-polarized light in the first time sequence period of time division multiplexing, and changes p-polarized light into s-polarized light in the second time sequence period.

Figure 9:
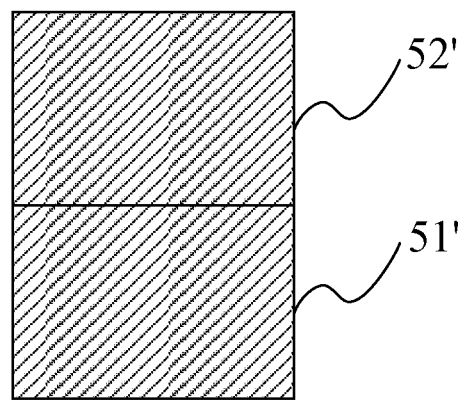
FIG. 9 is a schematic diagram of another display image observed by a driver using a head up display system provided by an embodiment of the present disclosure.
Figure 10:
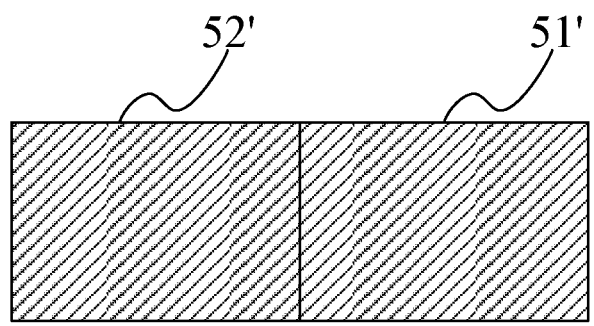
FIG. 10 is a schematic diagram of another display image observed by a driver using a head up display system provided by an embodiment of the present disclosure.

By adjusting the deflection directions of the first linearly polarized light P and the second linearly polarized light S through the optical path separator 140, two beams of s-polarized light that pass the second polarization conversion element 190 are allowed to have different propagation angles, such that display images with a large field of view can be realized at the vertical direction or the horizontal direction. As illustrated in FIG. 9, two beams of s-polarized light are deflected along the vertical direction towards opposite directions, such that the first image 51' and the second image 52' can be displayed along the vertical direction. When keeping the plane where the bottom surface of the optical path separator 140 as illustrated in FIG. 8 unchanged, and allowing the optical path separator 140 to rotate 90° clockwise/counter clockwise, the two beams of s-polarized light can be deflected along the horizontal direction towards opposite directions, so as to display the first image 51' and the second image 52' (as illustrated in FIG. 10) arranged along the horizontal direction. Further, by controlling the distance between the optical path separator 140 and the windshield and the distance between the second polarization conversion element 190 and the windshield, the relative position relationship between the images 51' and 52' can also be changed. For example, the above-mentioned images 51' and 52' can be arranged along a certain direction or the above-mentioned images 51' and 52' can be partially overlapped.

Figure 11:
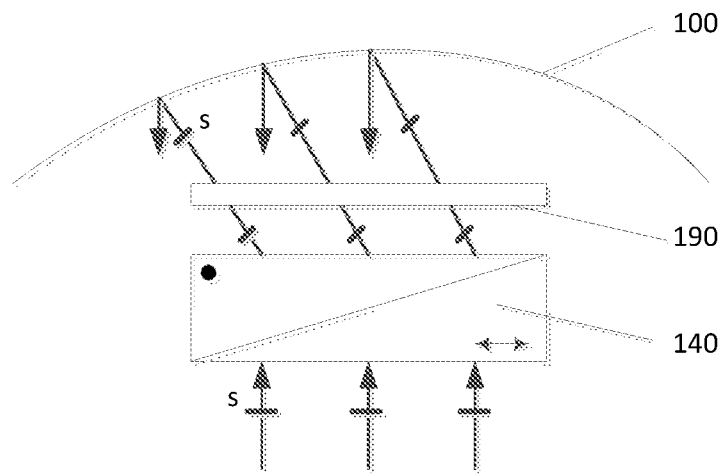
FIG. 11 schematically illustrates a light deflection state of s-polarized light after the s-polarized light passes an optical path separator and a second polarization conversion element during a first time interval.
Figure 12:
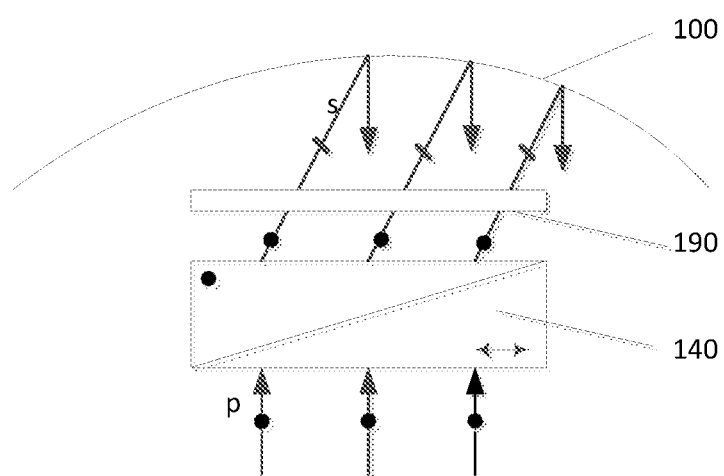
FIG. 12 schematically illustrates a light deflection state of p-polarized light after the p-polarized light passes an optical path separator and a second polarization conversion element during a second time interval.
Figure 13:
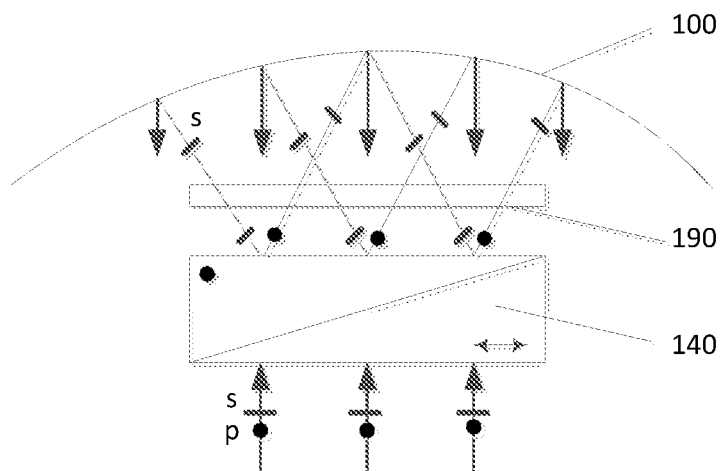
FIG. 13 schematically illustrates a case that an enlarged field of view of a driver through adopting polarization state time division multiplexing.

FIG. 11 and FIG. 12 respectively and schematically illustrate the deflection condition of light after the s-polarized light and the p-polarized light pass the optical path separator and the second polarization conversion element in the first time sequence period and in the second time sequence period. According to the properties that the reflectivity of the windshield for the s-polarized light is higher than the reflectivity of the windshield for the p-polarized light in the case where the incident angle is within a certain angle, by changing the polarization state of the light into the polarization state of the s-polarized light after the light passes the second polarization conversion element 190, for the head up display, the brightness of light which is into eyes of can be increased because larger reflectivity of the windshield 100 is obtained, such that the brightness of a backlit can be effectively reduced, and the power consumption of the entire head up display system can be reduced. Similarly, the polarization state of the p-polarized light can be set to be unchanged in one of the time sequence of time division multiplexing, and the s-polarized light can be converted into the p-polarized light in the other time sequence of time division multiplexing. Because the s-polarized light has a higher reflectivity, both of two kinds of linearly polarized light are preferably converted into s-polarized light. FIG. 13 schematically illustrates the case that the time division multiplexing depending on different polarization states enlarges a driver's field of view.

Figure 14:
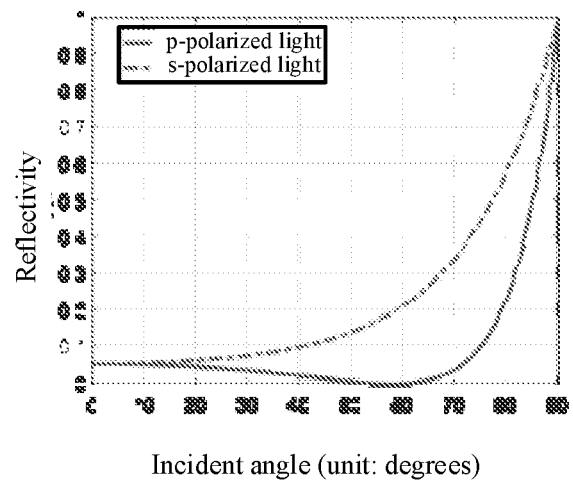
FIG. 14 illustrates the relationships between the reflectivity of s-polarized light and the incident angle of the s-polarized light and between the reflectivity of p-polarized light and the incident angle of the p-polarized light.

FIG. 14 illustrates the relationships between the reflectivity of s-polarized light and the incident angle of the s-polarized light and between the reflectivity of p-polarized light and the incident angle of the p-polarized light. In some passenger cars, the angle between the windshield and the horizontal plane is approximately 25 to 35 degrees, and the head up display has a looking down angle of approximately 5 degrees, and therefore, the light from the head up display system has an incident angle of approximately 60 to 70 degrees on the windshield. As can be seen from FIG. 14, the reflectivity of the s-polarized light and the reflectivity of the p-polarized light have large difference when the incident angle is between 60 to 70 degrees. Therefore, through converting the p-polarized light into the s-polarized light through the second polarization conversion element 190, the brightness of the entire image can be increased, and the power consumption can be reduced.

Furthermore, the second polarization conversion element 190 in the head up display system according to the present embodiment can also applied in the embodiment as illustrated in FIG. 1. For example, the second polarization conversion element 190 may be at the light exiting side of the polarization conversion element 3.

It should be noted that, through using the second polarization conversion element, the head up display method in the above-mentioned embodiments may convert the polarization direction of the first linearly polarized light into the same polarization direction as the second linearly polarized light after the propagation direction of the first linearly polarized light is deflected with the first angle and before the first linearly polarized light is reflected into human eyes in the first time intervals; or, the head up display method in the above-mentioned embodiments may convert the polarization direction of the second linearly polarized light into the same polarization direction as the first linearly polarized light after the propagation direction of the second linearly polarized light is deflected with the second angle and before the second linearly polarized light is reflected into human eyes in the second time intervals.

An embodiment of the present disclosure further provides a vehicle, such as a car, a train, an airplane, etc. The vehicle comprises the head up display system as described in the above-mentioned embodiments.

The advantages of the above-mentioned vehicle is the same as the advantages of the head up display system in the present embodiment, and no further description will be given here.

An embodiment of the present disclosure further provides a computer product, which comprises one or more processors, the processor is configured to run the computer instructions, so as to execute one step or a plurality of steps of the head up display method in the present embodiment.

An embodiment of the present disclosure further provides a computer-readable storage medium, which is configured to store non-transitory computer-readable instructions, upon a computer running the non-transitory computer-readable instructions, one step or a plurality of steps of the head up display method in the present embodiment is (are) performed.

In an embodiment of the present disclosure, modules or components (e.g., the display control module, the system control component, the image rendering component, etc.) may be implemented at least in part by software, so as to allow the modules or components to be executed by various types of processors. For example, an identified executable code module may include one or more physical or logical blocks of computer instructions, which, for example, may be constructed as objects, procedures, or functions. However, the executable codes of the identified module do not need to be physically located together, but can include different instructions stored in different physical positions. When these instructions are logically combined, they form a module and achieve the specified purpose of the module.

In fact, the executable code module can comprise a single instruction or many instructions, and can even be distributed in a plurality of code segments that are different, in different programs, and in a plurality of memory devices. Similarly, operational data can be identified within the module and can be implemented in any appropriate form and organized within any appropriate type of data structure. The operation data can be collected as a single data set, or can be distributed in different locations (including in different storage devices), and at least part of operation data can exist in a system or a network as an electronic signal only.

When a module or component can be realized by software, considering the level of existing hardware technology, those skilled in the art can build a corresponding hardware circuit to realize corresponding functions if the cost is not taken into consideration. The hardware circuit include a conventional very large scale integrated (VLSI) circuit or a gate array and an existing semiconductor or other discrete components such as a logic chip, a transistor etc. The module can also be realized by a programmable hardware device, such as a field programmable gate array, a programmable array logic, a programmable logic device, etc.

In addition, modules or components in some embodiments of the present disclosure (e. g., the display control module, the system control component, the image rendering component, etc.) may be special hardware devices for realizing some or all functions of the modules or components as described above. For example, the above modules or components may be one circuit board or a combination of several circuit boards, for realizing the functions as described above. In an embodiment of the present disclosure, the combination of one or more circuit boards may include: (1) one or more processors; (2) one or more non-transitory computer-readable memories connected with the processor; and (3) a firmware, executable by a processor, stored in the memory. In addition, the above modules or components may also be a combination of a memory, a processor and other hardware components. For example, the display control module may include a memory storing instructions and/or data, a processor processing data signals, and a display component such as a display, and the like.

Figure 15:
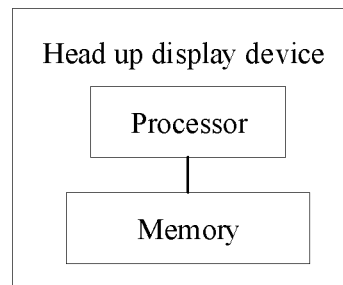
FIG. 15 schematically illustrates a head up display apparatus provided by an embodiment of the present disclosure.

For example, as illustrated in FIG. 15, an embodiment of the present disclosure further provides a head up display apparatus, including one or more processors and one or more memories. The processor can process data signals, and can include various computing structures, such as complex instruction set computer (CISC) structure, structure reduced instruction set computer (RISC) structure, or a combined structure that implements a plurality of instruction sets. The memory can store instructions and/or data executed by the processor. The above instructions and/or data may include codes for implementing some or all of the functions of one or more devices described in an embodiment of the present disclosure. For example, the memory includes dynamic random access memory (DRAM), static random access memory (SRAM), flash memory, optical memory, or other memory familiar to those skilled in the art.

The processor may be a central processing unit (CPU) or other form of processing unit with data processing capability and/or program execution capability, such as an image processing unit (GPU), a field programmable gate array (FPGA), or a tensor processing unit (TPU), etc.; for example, the central processing unit (CPU) may be implemented as an x86 architecture or an ARM architecture, etc. For example, the head up display apparatus may further include other components such as a display, and the processor can control the other components in the head up display apparatus to perform desired functions.

For example, the memory may include one computer program product or any combination of more computer program products, the computer program product may include various forms of computer-readable storage media, such as volatile memory and/or non-volatile memory. Volatile memory may include, for example, random access memory (RAM) and/or cache memory and the like. Non-volatile memory may include, for example, read-only memory (ROM), hard disk, erasable programmable read-only memory (EPROM), compact disk read-only memory (CD-ROM), USB memory, flash memory, and the like. One or more non-transitory computer-readable instructions can be stored in the computer-readable storage medium, and the processor can run the non-transitory computer-readable instructions to realize various functions of the device. In the computer-readable storage medium, various applications and data as well as various data used and/or generated by applications can also be stored.

For example, in some embodiments of the present disclosure, the above modules or components (e. g., the system control component) include codes and programs stored in a memory; the processor can execute the codes and programs to realize some or all functions of the above modules or components.

Some embodiments of the present disclosure further provides a computer-readable storage medium, which is configured to store non-transitory computer-readable instructions, upon a computer running the non-transitory computer-readable instructions, the above-mentioned head up display method is performed. For example, the computer-readable storage medium may be the memory of the head up display as described above.

The advantages of the above computer product is the same as the advantages of the head up display system in the present embodiment, and no further description will be given here.

What are described above is related to the illustrative embodiments of the disclosure only and not limitative to the scope of the disclosure; the scopes of the disclosure are defined by the accompanying claims.

What is claimed is:

1. A head up display system, comprising:
   a display device configured to output first linearly polarized light for displaying a first image in a first time intervals and output second linearly polarized light for displaying a second image in a second time intervals;
   a polarization beam splitting element in an optical path of light exiting from the display device, being configured to deflect a propagation direction of the first linearly polarized light by a first angle and deflect a propagation direction of the second linearly polarized light by a second angle, and the first angle and the second angle are different from each other, wherein the polarization beam splitting element comprises a polarization splitting prism; and at least one reflector, the at least one reflector being in the optical path between the display device and the polarization beam splitting element, and being configured to change propagation directions of the first linearly polarized light and the second linearly polarized light.

2. The head up display system according to claim 1, wherein the first time intervals in which the display device is configured to output the first linearly polarized light and the second time intervals in which the display device is configured to output the second linearly polarized light are alternatively arranged.

3. The head up display system according to claim 2, wherein a sum of one first time interval and one second time interval adjacent to each other is smaller than or equal to a response time of persistence of vision of human eyes.

4. The head up display system according to claim 1, wherein the display device comprises:

a display component configured to display the first image in the first time intervals and display the second image in the second time intervals; and a first polarization conversion element at an image display side of the display component, being configured to convert light of the first image into the first linearly polarized light in the first time intervals and to convert light of the second image into the second linearly polarized light in the second time intervals, and a vibration direction of the first linearly polarized light and a vibration direction of the second linearly polarized light are perpendicular to each other.

5. The head up display system according to claim 1, wherein the reflector comprises at least one selected from the group consisting of a plane reflector, a spherical reflector, an aspheric reflector and a freeform reflector.

6. The head up display system according to claim 1, wherein the reflector comprises one non-planar reflector; or, the reflector comprises at least two reflectors which include at least one non-planar reflector.

7. The head up display system according to claim 1, wherein the polarization splitting prism comprises two right angle prisms, optical axis directions of which are perpendicular to each other.

8. The head up display system according to claim 7, wherein the polarization beam splitting element comprises one polarization splitting prism; or, the polarization beam splitting element comprises at least two polarization splitting prisms, the at least two polarization splitting prisms are stacked with each other, and for two adjacent polarization splitting prisms, right angle prisms with the same optical axis direction are in contact with each other.

9. The head up display system according to claim 1, further comprising: a first optical element in an optical path of the first linearly polarized light after the first linearly polarized light being deflected, and a second optical element in an optical path of the second linearly polarized light after the second linearly polarized light being deflected, wherein the first optical element is configured to reflect the first linearly polarized light into human eyes, and the second optical element is configured to reflect the second linearly polarized light into the human eyes.

10. The head up display system according to claim 9, wherein each of the first optical element and the second optical element comprises a holographic optical element.

11. The head up display system according to claim 4, wherein the display device further comprises an image rendering component connected with the display component; and the image rendering component is configured to output a signal of the first image to the display component in the first time intervals, and to output a signal of the second image to the display component in the second time intervals.

12. The head up display system according to claim 11, wherein the display device further comprises a system control component connected with the image rendering component and the first polarization conversion element; and the system control component is configured to control a time sequence and a frequency of outputting the first image and the second image output by the image rendering component, and to control the first polarization conversion element to perform polarization conversion to the light of the first image and the light of the second image.

13. The head up display system according to claim 11, wherein the display device further comprises an aberration compensation circuit; and the aberration compensation circuit is respectively connected with the system control component and the image rendering circuit, and the aberration compensation circuit is configured to compensate an aberration introduced by a light angle changing element in the head up display system, and to input an aberration compensation signal into the image rendering component.

14. The head up display system according to claim 13, wherein the display device further comprises a collimator which is at a light-exiting side of the display component and configured to collimate light that is output by the display component.

15. The head up display system according to claim 1, further comprising a second polarization conversion element at a light-exiting side of the polarization beam splitting element, wherein the second polarization conversion element is configured to convert the first linearly polarized light into the second linearly polarized light, or convert the second linearly polarized light into the first linearly polarized light.

16. A vehicle comprising: the head up display system according to claim 1.

* * * * *